(12) United States Patent
Jeoung et al.

(10) Patent No.: US 10,051,248 B2
(45) Date of Patent: Aug. 14, 2018

(54) OPTICAL DEVICE INCLUDING A WHEEL THAT CONVERTS A WAVELENGTH OF LIGHT AND IMAGE PROJECTION APPARATUS INCLUDING THE SAME

(71) Applicant: LG ELECTRONICS INC., Seoul (KR)

(72) Inventors: Byungwoo Jeoung, Seoul (KR); Sangok Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/314,609

(22) PCT Filed: May 30, 2015

(86) PCT No.: PCT/KR2015/005449
§ 371 (c)(1),
(2) Date: Nov. 29, 2016

(87) PCT Pub. No.: WO2015/183053
PCT Pub. Date: Dec. 3, 2015

(65) Prior Publication Data
US 2017/0201730 A1     Jul. 13, 2017

(30) Foreign Application Priority Data

May 30, 2014    (KR) .................. 10-2014-0066488

(51) Int. Cl.
*G03B 21/20*     (2006.01)
*H04N 9/31*     (2006.01)
(Continued)

(52) U.S. Cl.
CPC ......... *H04N 9/3167* (2013.01); *G02B 5/3083* (2013.01); *G02B 26/008* (2013.01);
(Continued)

(58) Field of Classification Search
CPC .. G02B 26/008; G02B 27/283; G02B 27/286; G02B 5/3083; G03B 21/204;
(Continued)

(56) References Cited

U.S. PATENT DOCUMENTS

| 5,867,239 A | 2/1999 | Sahouani et al. |
| 2005/0237487 A1 | 10/2005 | Chang |

(Continued)

FOREIGN PATENT DOCUMENTS

| KR | 10-2010-0035775 | 4/2010 |
| WO | WO 2008/129539 | 10/2008 |
| WO | WO 2014/016574 | 1/2014 |

OTHER PUBLICATIONS

International Search Report dated Sep. 15, 2015 issued in Application No. PCT/KR2015/005449.
(Continued)

*Primary Examiner* — Sultan Chowdhury
*Assistant Examiner* — Magda Cruz
(74) *Attorney, Agent, or Firm* — Ked & Associates, LLP (57) ABSTRACT

An optical device and an image projection apparatus including the same are disclosed. The optical device includes a laser diode for outputting a laser light having a predetermined wavelength, a polarization separator for transmitting a first polarized light of the laser light and reflecting a second polarized light of the laser light, a wheel including a wavelength conversion unit for converting a wavelength of the second polarized light of the laser light reflected by the polarization separator such that the second polarized light of the laser light corresponds to one selected from among a blue light, a green light, and a red light and a transmission unit for transmitting the other lights, a polarization converter for converting the light transmitted through the wheel into the first polarized light and outputting the converted first
(Continued)

polarized light to the wheel, and an optical output unit for outputting the first polarized light from the polarization converter and the light converted in wavelength and reflected by the wheel. Consequently, it is possible to provide a compact optical device that is capable of achieving highly efficient light output.

13 Claims, 11 Drawing Sheets

(51) Int. Cl.
    *G02B 26/00*     (2006.01)
    *G02B 27/28*     (2006.01)
    *G02B 5/30*     (2006.01)

(52) U.S. Cl.
    CPC ......... *G02B 27/283* (2013.01); *G03B 21/204* (2013.01); *G03B 21/2066* (2013.01); *H04N 9/3114* (2013.01); *H04N 9/3161* (2013.01)

(58) Field of Classification Search
    CPC ............ G03B 21/2066; G03B 21/2073; G03B 33/08; H04N 9/3114; H04N 9/3161; H04N 9/3167
    See application file for complete search history.

(56) References Cited

U.S. PATENT DOCUMENTS

| | | |
|---|---|---|
| 2011/0310363 A1 | 12/2011 | Kita |
| 2012/0026472 A1 | 2/2012 | Masuda |
| 2012/0242912 A1 | 9/2012 | Kitano |
| 2013/0107225 A1 | 5/2013 | Miyazaki |
| 2013/0242534 A1 | 9/2013 | Pettitt et al. |
| 2014/0016297 A1 | 1/2014 | Mehl |
| 2014/0118991 A1* | 5/2014 | Lin ...................... G02B 26/008 362/84 |
| 2014/0226301 A1* | 8/2014 | Khan ................... G02B 26/008 362/19 |

OTHER PUBLICATIONS

International Search Report and Written Opinion dated Sep. 15, 2015 issued in Application No. PCT/KR2015/005449 (Full English text).

European Search Report dated Dec. 14, 2017 issued in Application No. 15799769.3.

\* cited by examiner

OPTICAL DEVICE INCLUDING A WHEEL THAT CONVERTS A WAVELENGTH OF LIGHT AND IMAGE PROJECTION APPARATUS INCLUDING THE SAME

CROSS-REFERENCE TO RELATED PATENT APPLICATIONS

This application is a U.S. National Stage Application under 35 U.S.C. § 371 of PCT Application No. PCT/KR2015/005449, filed May 30, 2015, which claims priority to Korean Patent Application No. 10-2014-0066488, filed May 30, 2014, whose entire disclosures are hereby incorporated by reference.

TECHNICAL FIELD

The present invention relates to an optical device and an image projection apparatus including the same, and more particularly to a compact optical device that is capable of achieving highly efficient light output and an image projection apparatus including the same.

BACKGROUND ART

An image projection apparatus is an apparatus that projects an image. In particular, the image projection apparatus may project an image on a screen.

With the increase in resolution of an image, there is an increasing necessity for achieving highly efficient light output at the time of projecting the image. To this end, it is necessary to efficiently design an optical unit of the image projection apparatus. Much research has been conducted into the optical unit of the image projection apparatus.

Conventionally, lamps, such as a high intensity discharge (HID) lamp, a metal halide lamp, and an ultra high pressure (UHP) lamp, have been used as a light source for high power projection. However, it has been required to improve the conventional lamps due to short life spans, environmental regulations, and low efficiencies of the lamps. For this reason, research has been actively conducted on methods of using a high power laser diode (LD) as the light source.

For example, Japanese Patent Application Publication No. 2011-013313 discloses a light source device that uses a blue light emitting diode and a phosphor wheel for outputting a red light and a green light in addition to a blue light. In the disclosure, however, optical paths for the blue light, the red light, and the green light are divided. In order to divide the optical paths, at least four mirrors are used with the result that it is difficult to provide a compact optical device.

DISCLOSURE OF INVENTION

Technical Problem

It is an object of the present invention to provide a compact optical device that is capable of achieving highly efficient light output and an image projection apparatus including the same.

Solution to Problem

In accordance with an aspect of the present invention, the above and other objects can be accomplished by the provision of an optical device including a laser diode for outputting a laser light having a predetermined wavelength, a polarization separator for transmitting a first polarized light of the laser light and reflecting a second polarized light of the laser light, a wheel including a wavelength conversion unit for converting a wavelength of the second polarized light of the laser light reflected by the polarization separator such that the second polarized light of the laser light corresponds to one selected from among a blue light, a green light, and a red light and a transmission unit for transmitting the other lights, a polarization converter for converting the light transmitted through the wheel into the first polarized light and outputting the converted first polarized light to the wheel, and an optical output unit for outputting the first polarized light from the polarization converter and the light converted in wavelength and reflected by the wheel.

In accordance with another aspect of the present invention, there is provided an image projection apparatus including a controller for outputting an image signal and an image output unit for outputting an image to be projected based on the image signal from the controller, wherein the image output unit includes an optical unit for outputting a visible light, and the optical unit includes a laser diode for outputting a laser light having a predetermined wavelength, a polarization separator for transmitting a first polarized light of the laser light and reflecting a second polarized light of the laser light, a wheel including a wavelength conversion unit for converting a wavelength of the second polarized light of the laser light reflected by the polarization separator such that the second polarized light of the laser light corresponds to one selected from among a blue light, a green light, and a red light and a transmission unit for transmitting the other lights, a polarization converter for converting the light transmitted through the wheel into the first polarized light and outputting the converted first polarized light to the wheel, and an optical output unit for outputting the first polarized light from the polarization converter and the light converted in wavelength and reflected by the wheel.

Advantageous Effects of Invention

An optical device according to an embodiment of the present invention and an image projection apparatus including the same each include a laser diode for outputting a laser light having a predetermined wavelength, a polarization separator for transmitting a first polarized light of the laser light and reflecting a second polarized light of the laser light, a wheel including a wavelength conversion unit for converting a wavelength of the second polarized light of the laser light reflected by the polarization separator such that the second polarized light of the laser light corresponds to one selected from among a blue light, a green light, and a red light and a transmission unit for transmitting the other lights, a polarization converter for converting the light transmitted through the wheel into the first polarized light and outputting the converted first polarized light to the wheel, and an optical output unit for outputting the first polarized light from the polarization converter and the light converted in wavelength and reflected by the wheel. Consequently, it is possible to provide a compact optical device that is capable of achieving highly efficient light output.

In particular, the polarization converter is used. As a result, it is possible to align optical output paths of the blue light, the green light, and the red light from the wheel and the optical output unit, whereby it is possible to provide a compact optical device that is capable of achieving highly efficient light output.

Meanwhile, the polarization converter is disposed at the rear of the wheel. At the time of outputting a high power light, therefore, only a specific light, e.g. a blue light, is incident upon the polarization converter and is then output from the polarization converter. Consequently, it is possible to improve reliability of the polarization converter. In addition, it is possible to increase a degree of freedom in design for optical lenses disposed between the wheel and the polarization separator or between the polarization separator and the polarization converter.

In a case in which the transmission unit of the wheel has a diffusion part, on the other hand, it is possible to prevent reduction of contrast in the vicinity of the diffusion part.

Meanwhile, a second wheel may be further provided between the optical output unit and the polarization separator for outputting a high power red light, a high power blue light, and a high power green light.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Exemplary embodiments of the present invention will be described in more detail with reference to the accompanying drawings.

The terms "module" and "unit," when attached to the names of components are used herein to help the understanding of the components and thus they should not be considered as having specific meanings or roles. Accordingly, the terms "module" and "unit" may be used interchangeably.

An optical device as described in this specification is a device that is capable of outputting a visible light. The optical device may be applied to an image projection apparatus. Alternatively, the optical device may be applied to a lighting apparatus.

Meanwhile, an image projection apparatus as described in this specification is an apparatus that is capable of projecting an image to the outside. For example, the image projection apparatus may be a projector.

On the other hand, the image projection apparatus as described in this specification may be mounted in another apparatus as a component. For example, the image projection apparatus may be mounted in a mobile terminal. Alternatively, the image projection apparatus may be mounted in an electric home appliance, such as an air conditioner, a refrigerator, a cooking apparatus, or a robot cleaner. In another example, the image projection apparatus may be mounted in a vehicle, such as a car.

Hereinafter, such an image projection apparatus will be described in detail.

Figure 1:
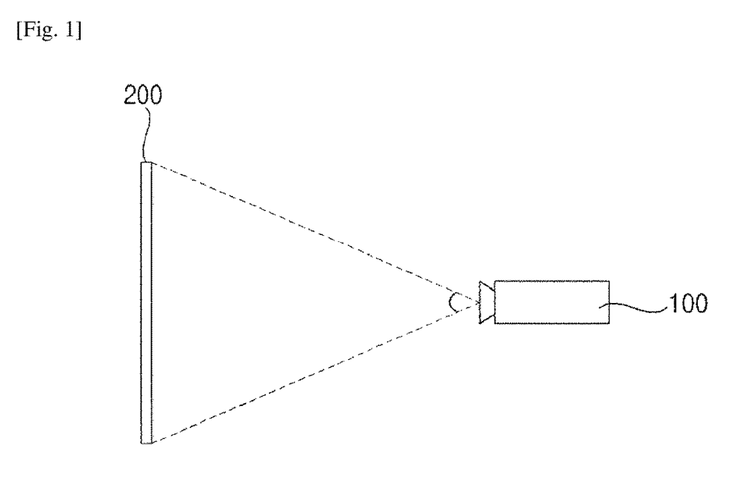
FIG. 1 is a view showing the external appearance of an image projection apparatus according to an embodiment of the present invention.

FIG. 1 is a view showing the external appearance of an image projection apparatus according to an embodiment of the present invention.

Referring to the figure, an image projection apparatus 100 may project an image on a screen 200.

In the figure, the screen 200 is shown as having a flat surface. Alternatively, the screen may have a curved surface.

A user may view the image projected on the screen 200.

Figure 2:
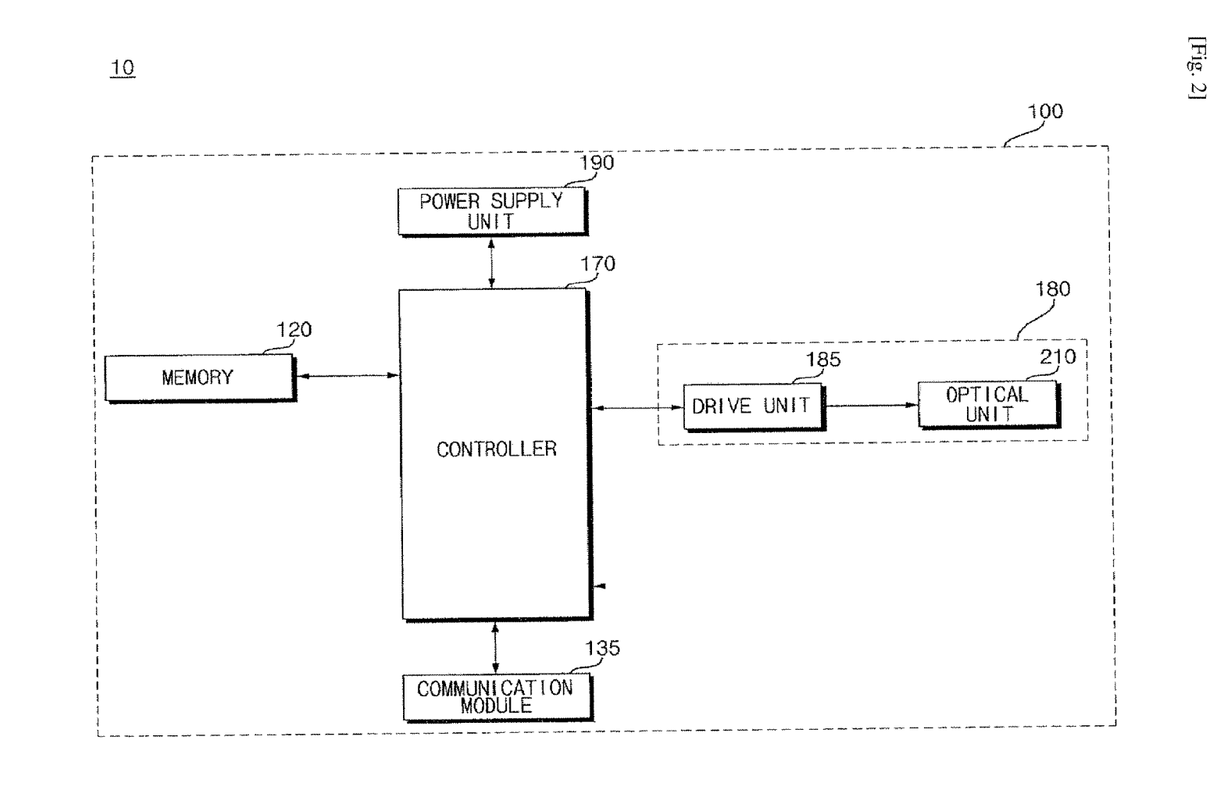
FIG. 2 is an internal block diagram showing an example of the image projection apparatus of FIG. 1.

FIG. 2 is an internal block diagram showing an example of the image projection apparatus of FIG. 1.

Referring to the figure, the image projection apparatus 100 may include a memory 120, a controller 170, a communication module 135, an image output unit 180, and a power supply unit 190.

The image output unit 180 may include a drive unit 185 and an optical unit 210.

The drive unit 185 may drive the optical unit 210. Specifically, the drive unit 185 may drive a light source mounted in the optical unit 210.

The optical unit 210 may include optical elements, such as a light source and a lens, for light output, specifically visible light output.

Particularly, in this embodiment of the present invention, a compact optical unit that is capable of achieving highly efficient light output, which will hereinafter be described in detail with reference to FIG. 4 and subsequent figures.

The memory 120 may store a program for processing or control of the controller 170. In addition, the memory 120 may temporarily store input or output data (e.g. still pictures and motion pictures).

The communication module 135 functions as an interface with all external devices connected to the image projection apparatus 100 in a wired or wireless fashion or a network. The communication module 135 may transmit data or power from the external devices to components in the image projection apparatus 100. In addition, the communication module 135 may transmit data from the image projection apparatus 100 to the external devices.

In particular, the communication module 135 may receive a wireless signal from an adjacent mobile terminal (not shown). The wireless signal may include a voice call signal, a video communication call signal, or various types of data, such as text data and image data.

To this end, the communication module 135 may include a short range communication module (not shown). Bluetooth, radio frequency identification (RFID), infrared data association (IrDA), ultra wideband (UWB), ZigBee, or near field communication (NFC) may be used as short range communication technology.

The controller 170 may control overall operation of the image projection apparatus 100. Specifically, the controller 170 may control operations of the respective units in the image projection apparatus 100.

The controller 170 may control a video stored in the memory 120 or a video received from an external device through the communication module 135 to be projected to the outside.

To this end, the controller 170 may control the drive unit 185 to drive the optical unit 210, which outputs a visible light including red (R), green (G), and blue (B) lights. Specifically, R, G, and B signals corresponding to a video to be displayed may be output to the drive unit 185.

The power supply unit 190 may supply external power or internal power to the respective components of the image projection apparatus 100 under control of the controller 170.

The power supply unit 190 may supply power to the respective components of the image projection apparatus 100. Specifically, the power supply unit 190 may supply power to the controller 170, which may be configured in the form of a system on chip (SOC), the image output unit 180 for image display, and an audio output unit (not shown) for audio output.

Figure 3:
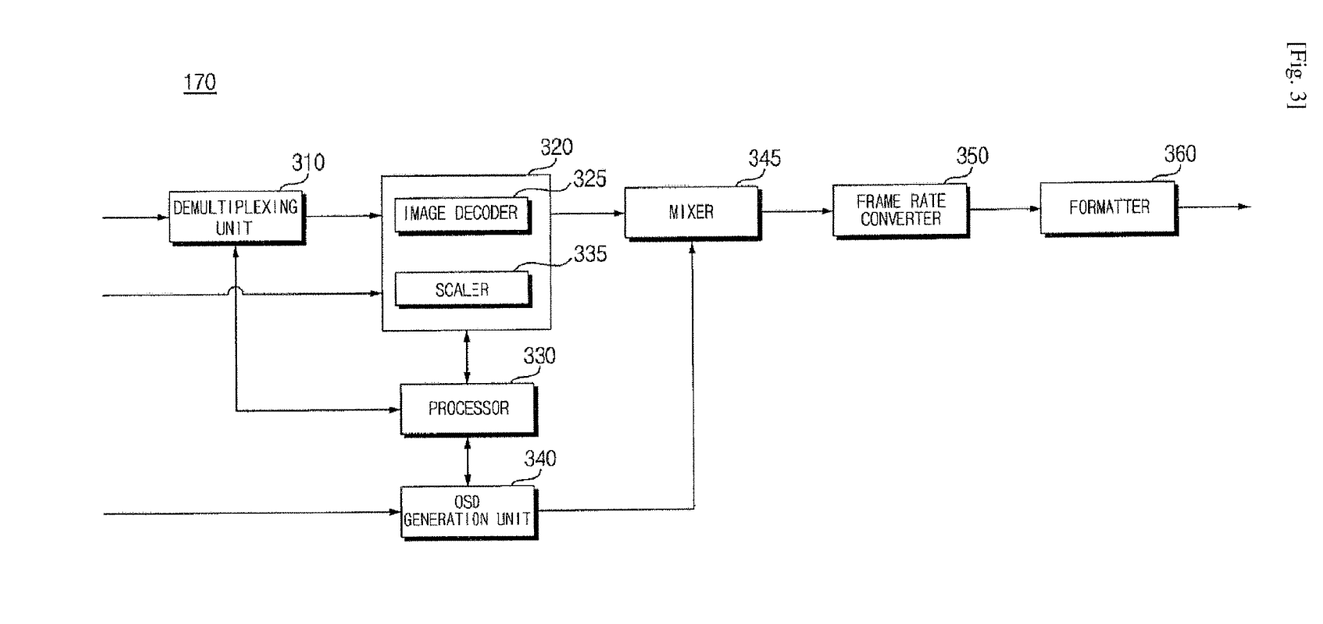
FIG. 3 is an internal block diagram showing an example of a controller of FIG. 2.

FIG. 3 is an internal block diagram showing the controller of FIG. 2.

Referring to the figure, the controller 170 according to the embodiment of the present invention may include a demultiplexing unit 310, an image processing unit 320, a processor 330, an on-screen display (OSD) generation unit 340, a mixer 345, a frame rate converter 350, and a formatter 360. In addition, the controller 170 may further include an audio processing unit (not shown) and a data processing unit (not shown).

The demultiplexing unit 310 may demultiplex an input stream.

The image processing unit 320 may process a demultiplexed image signal. To this end, the image processing unit 320 may include an image decoder 325 and a scaler 335.

The image decoder 325 may decode the demultiplexed image signal, and the scaler 335 may scale the resolution of the decoded image signal such that the image signal can be output by the display unit 180. The image decoder 325 may include decoders based on various standards.

The processor 330 may control overall operation of the image projection apparatus 100 or overall operation of the controller 170. In addition, the processor 330 may control operations of the demultiplexing unit 310, the image processing unit 320, and the OSD generation unit 340 of the controller 170.

The OSD generation unit 340 may generate an OSD signal according to a user input or autonomously.

The mixer 345 may mix the OSD signal generated by the OSD generation unit 340 with the decoded image signal processed by the image processing unit 320. The mixed image signal may be provided to the frame rate converter 350.

The frame rate converter (FRC) 350 may convert a frame rate of an input image. On the other hand, the frame rate converter 350 may directly output an input image without conversion of the frame rate of the input image.

The formatter 360 may receive the signal mixed by the mixer 345, i.e. the OSD signal and the decoded image signal, and perform signal conversion such that the signal can be input to the image output unit 180. For example, the formatter 360 may output a low voltage differential signal (LVDS).

Meanwhile, the block diagram of the controller 170 shown in FIG. 3 is a view showing the embodiment of the present invention. The respective components of the block diagram may be combined, added, or omitted according to the specifications of the controller 170 which is actually configured.

In particular, the frame rate converter 350 and the formatter 360 may not be provided in the controller 170 but may be separately provided. Alternatively, the frame rate converter 350 and the formatter 360 may be provided as a single module.

Figure 4:
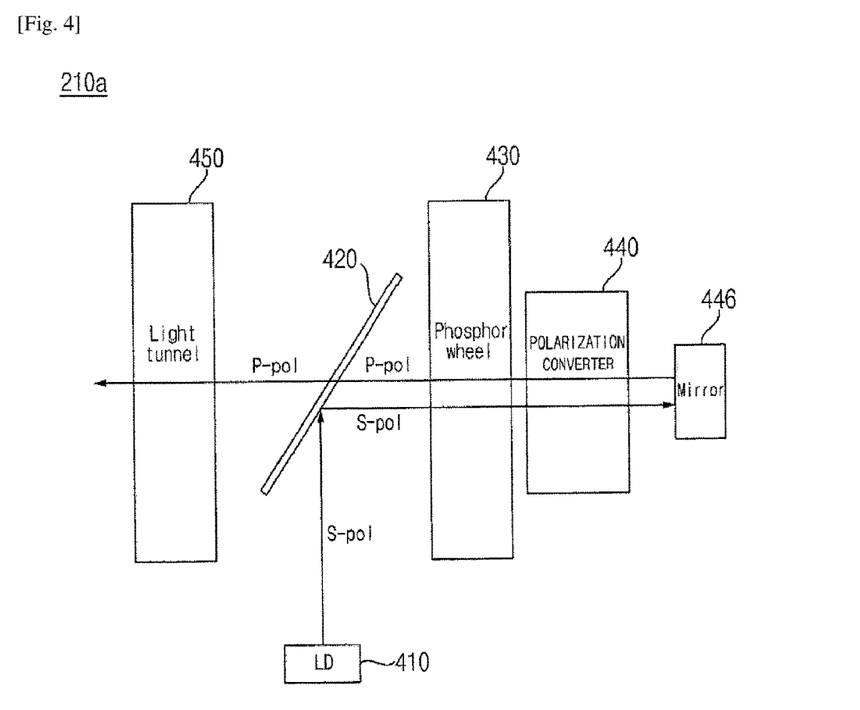
FIGS. 4 and 5 are views showing an example of the structure of an optical unit of FIG. 2.
Figure 5:
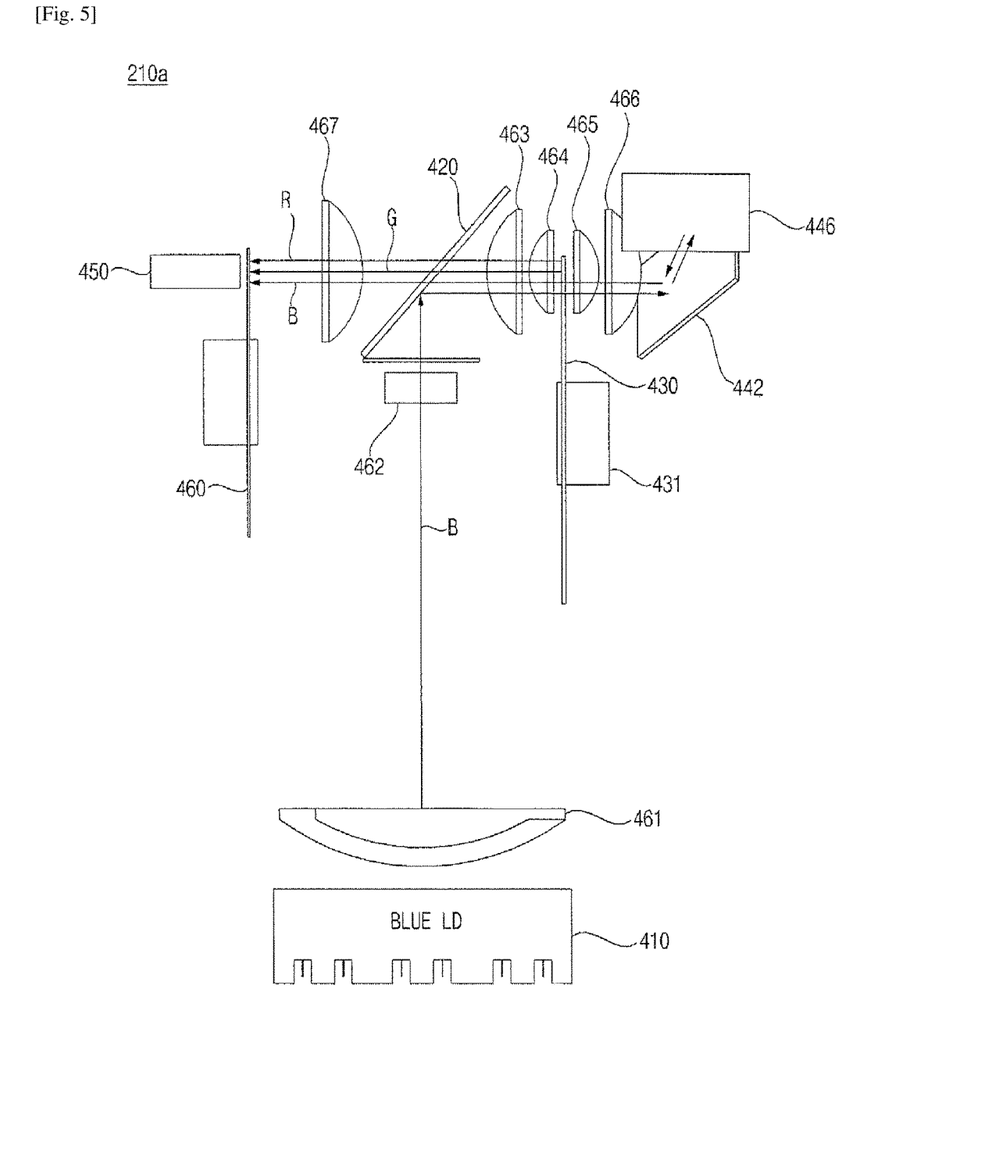

FIGS. 4 and 5 are views showing an example of the structure of the optical unit of FIG. 2.

Referring to the figures, an optical unit 210a may include a laser diode 410, a polarization separator 420, a wheel 430, a polarization converter 440, and an optical output unit 450. In addition, the optical unit 210a may further include a mirror 446. Furthermore, the optical unit 210a may further include optical lenses, such as collimator lenses 461, 462, 463, 464, 465, 466, and 467.

In this embodiment of the present invention, the laser diode 410 is used as a light source. The laser diode 410 may output a laser light.

The laser light may be incident upon the wheel 430 via the polarization separator 420. At this time, the laser light may be incident upon a phosphor applied to the wheel as an excitation source such that light having another waveform can be output.

In order to provide a multicolored light source having high luminance, a plurality of light emitting diodes (LED) may be used instead of the laser diode (LD).

Meanwhile, the laser diode 410 may output a UV light or a blue light.

The polarization separator 420 may transmit a first polarized light of the laser light and reflect a second polarized light of the laser light.

The wheel 430 may include a wavelength conversion unit for converting a wavelength of the second polarized light of the laser light reflected by the polarization separator 420 such that the second polarized light of the laser light corresponds to one selected from among a blue light, a green light, and a red light and a transmission unit for transmitting the other lights.

The wheel 430 may be rotated by a wheel motor 431. The wavelength conversion unit may be coated with a phosphor. For this reason, the wheel 430 may be referred to as a phosphor wheel.

The polarization converter 440 may convert the second polarized light of the laser light transmitted through the wheel 430 into the first polarized light and output the converted first polarized light to the wheel 430.

The optical output unit 450 may output the first polarized light from the polarization converter 440 and the light reflected by the wheel 430. In particular, the optical output unit 450 may include a light tunnel for light condensation.

Meanwhile, the wheel 430 may transmit the first polarized light from the polarization converter 440 and output the transmitted first polarized light to the polarization separator 420. The polarization separator 420 may transmit the first polarized light from the wheel 430 and output the transmitted first polarized light to the optical output unit 450. In addition, the polarization separator 420 may transmit the light reflected by the wheel 430 and output the transmitted light to the optical output unit 450.

The mirror 446 may reflect the light reflected by the polarization converter 440 and output the reflected light to the polarization converter 440.

A second wheel 460 may be disposed between the optical output unit 450 and the polarization separator 420 for sequentially transmitting the blue light, the green light, and the red light from the polarization separator 420 to the optical output unit 450.

Since the polarization separator 420 reflects or transmits light based on polarization of the light, the laser diode 410 may output an S-polarized blue light or a P-polarized blue light.

Particularly, in a case in which the polarization separator 420 transmits a P-polarized light and reflects an S-polarized light, the laser diode 410 may output an S-polarized blue light.

The S-polarized blue light output by the laser diode 410 is collimated via the optical lenses 461 and 462 and is then incident upon the polarization separator 420. At this time, the light is refracted, i.e. reflected, and is then incident upon the wheel 430.

Meanwhile, in a case in which an S-polarized blue light is incident upon the wavelength conversion unit of the wheel 430 during rotation of the wheel 430 in a state in which a green phosphor and a red phosphor are applied to the wavelength conversion unit of the wheel 430, the S-polarized blue light may be converted in wavelength into a green light and a red light. As a result, the green light and the red light may be reflected by upon the wavelength conversion unit of the wheel 430. On the other hand, in a case in which an S-polarized blue light is incident upon the transmission unit of the wheel 430, to which a plurality of phosphors is applied, the S-polarized blue light may be transmitted through the transmission unit of the wheel 430 without change.

When the S-polarized blue light is incident upon the polarization converter 440, the polarization converter 440 refracts the light to the mirror 446. When the light from the mirror 446 is incident upon the polarization converter 440 again, the polarization converter 440 refracts the light to the wheel 430.

For polarization conversion, the polarization converter 440 may include a quarter wavelength plate (QWP) 442. When an S-polarized blue light is incident upon the QWP, the QWP changes the phase of the light by ¼ wavelength such that the light is refracted to the mirror 446. When the light from the mirror is incident upon the QWP, the QWP changes the phase of the light by ¼ wavelength. As a result, the QWP outputs the light converted in phase by ½ wavelength, i.e. a P-polarized blue light, to the wheel 430.

In a case in which the P-polarized blue light from the polarization converter 440 is incident upon the transmission unit of the wheel 430, the light is transmitted through the wheel 430 and then reaches the polarization separator 420. The light is transmitted through the polarization separator 420 and then reaches the second wheel 460.

Meanwhile, the unpolarized green light and red light reflected by the wheel 430 reach the polarization separator 420. The lights are transmitted through the polarization separator 420 and then reach the second wheel 460.

The second wheel 460 sequentially outputs the blue light, the green light, and the red light from the polarization separator 420 to the optical output unit 450 during rotation of the second wheel 460. The optical output unit 450 outputs the condensed blue light, green light, and red light.

Meanwhile, a yellow phosphor, a green phosphor, and a red phosphor may be applied to the wavelength conversion unit of the wheel 430.

In a case in which an S-polarized blue light is incident upon the wavelength conversion unit of the wheel 430 during rotation of the wheel 430 in a state in which the yellow phosphor, the green phosphor, and the red phosphor are applied to the wavelength conversion unit of the wheel 430, the S-polarized blue light may be converted in wavelength into a yellow light, a green light, and a red light, which may be reflected. On the other hand, in a case in which an S-polarized blue light is incident upon the transmission unit of the wheel 430, to which a plurality of phosphors is applied, the S-polarized blue light may be transmitted through the transmission unit of the wheel 430 without change.

Meanwhile, the unpolarized yellow light, green light, and red light converted in wavelength and reflected by the wheel 430 reach the polarization separator 420. The lights are transmitted through the polarization separator 420 and then reach the second wheel 460.

The second wheel 460 sequentially outputs the yellow light, the blue light, the green light, and the red light from the polarization separator 420 to the optical output unit 450 during rotation of the second wheel 460. The optical output unit 450 outputs the condensed blue light, yellow light, green light, and red light.

Meanwhile, in the optical unit 210a of FIGS. 4 and 5, the polarization separator 420 reflects a P-polarized blue light and transmits an S-polarized blue light. To this end, the polarization converter 440, the wheel 430, the polarization separator 420, and the optical output unit 450 are arranged in a line.

The optical unit 210a may be referred to as a solid state illumination (SSI).

Figure 6:
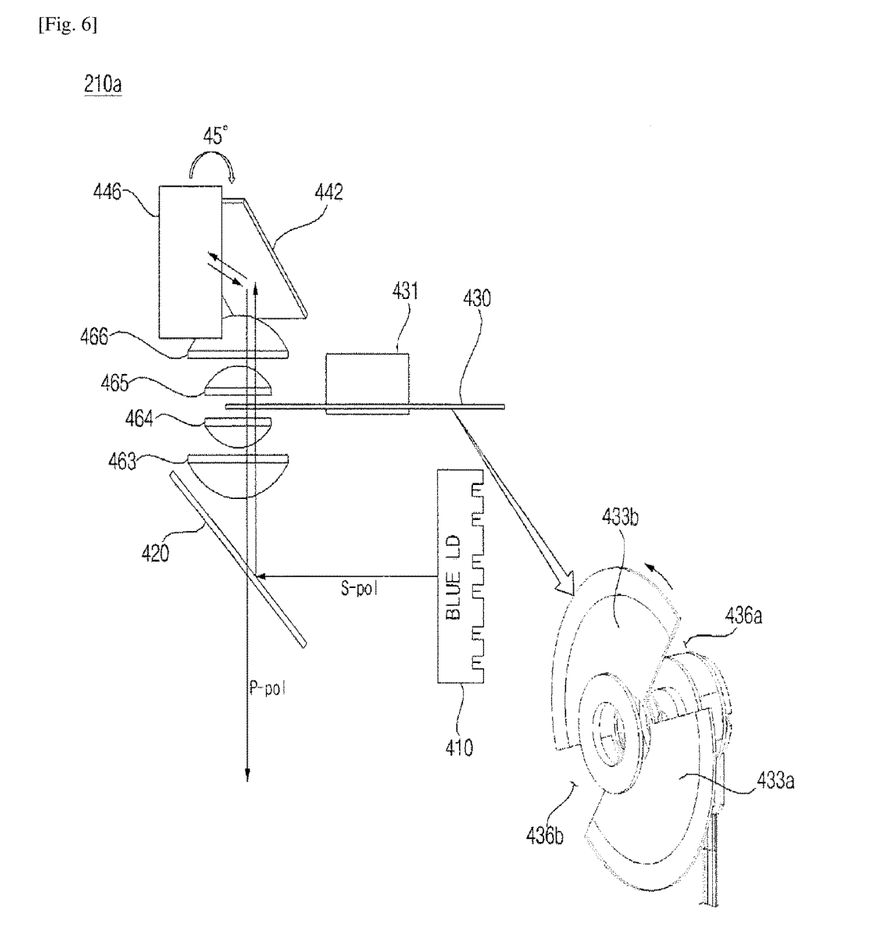
FIG. 6 is a view showing an example of the structure of a wheel of FIGS. 4 and 5.

FIG. 6 is a view showing an example of the structure of the wheel of FIGS. 4 and 5.

Referring to the figure, a wheel 430 of FIG. 6 may include wavelength conversion units 433a and 433b and transmission units 436a and 436b.

A green phosphor and a red phosphor may be applied to the wavelength conversion units 433a and 433b. As a result, light may be converted in wavelength into a green light and a red light by the wavelength conversion units 433a and 433b.

Alternatively, a yellow phosphor, a green phosphor, and a red phosphor may be applied to the wavelength conversion units 433a and 433b. As a result, light may be converted in wavelength into a yellow light, a green light, and a red light by the wavelength conversion units 433a and 433b.

The transmission units 436a and 436b may have apertures in a state in which no phosphor is applied to the transmission units 436a and 436b. As a result, an S-polarized blue light may be transmitted through the transmission units 436a and 436b without change.

As described above, the optical unit 210a according to the embodiment of the present invention includes the polarization converter 440. As a result, it is possible to align optical output paths of the blue light, the green light, and the red light from the wheel 430 and the optical output unit 450, whereby it is possible to provide a compact optical device that is capable of achieving highly efficient light output.

Meanwhile, the polarization converter 440 is disposed at the rear of the wheel 430. At the time of outputting a high power light, therefore, only the blue light is incident upon the polarization converter 440 and is then output from the polarization converter 440. Consequently, it is possible to increase the lifespan of components constituting the polarization converter 440, thereby improving reliability of the optical device. In addition, it is possible to increase a degree of freedom in design for the optical lenses 463, 464, 465, and 466 disposed between the wheel 430 and the polarization separator 420 or between the polarization separator 420 and the polarization converter 440.

Figure 7:
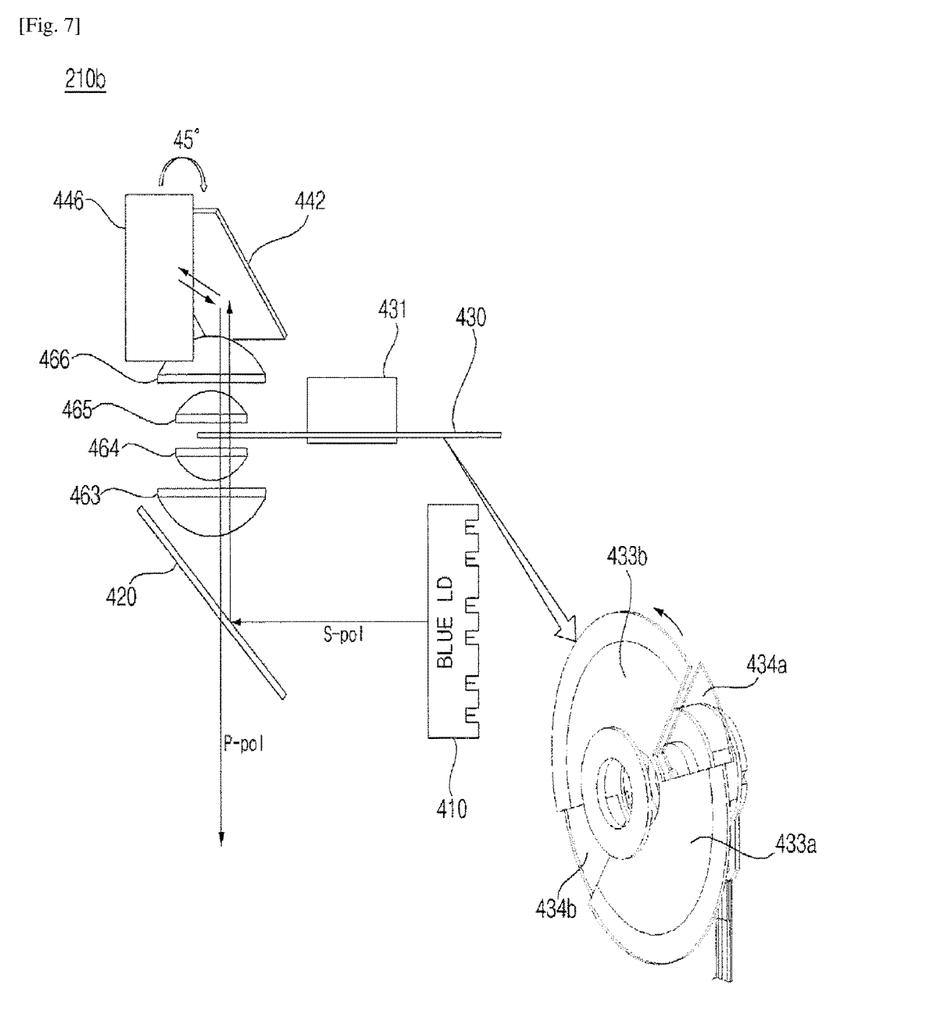
FIG. 7 is a view showing another example of the structure of the wheel of FIGS. 4 and 5.

FIG. 7 is a view showing another example of the structure of the wheel of FIGS. 4 and 5.

Referring to the figure, a wheel 430 in an optical unit 210b of FIG. 7 may include wavelength conversion units 433a and 433b and transmission units 434a and 434b.

A green phosphor and a red phosphor may be applied to the wavelength conversion units 433a and 433b. As a result, light may be converted in wavelength into a green light and a red light by the wavelength conversion units 433a and 433b.

Alternatively, a yellow phosphor, a green phosphor, and a red phosphor may be applied to the wavelength conversion units 433a and 433b. As a result, light may be converted in wavelength into a yellow light, a green light, and a red light by the wavelength conversion units 433a and 433b.

The transmission units 434a and 434b may have diffusion parts. The transmission units 434a and 434b may transmit an S-polarized blue light without change. The S-polarized blue light in the vicinity of the diffusion parts is diffused by the diffusion parts. As a result, it is possible to prevent reduction in contrast of the blue light.

Figure 8:
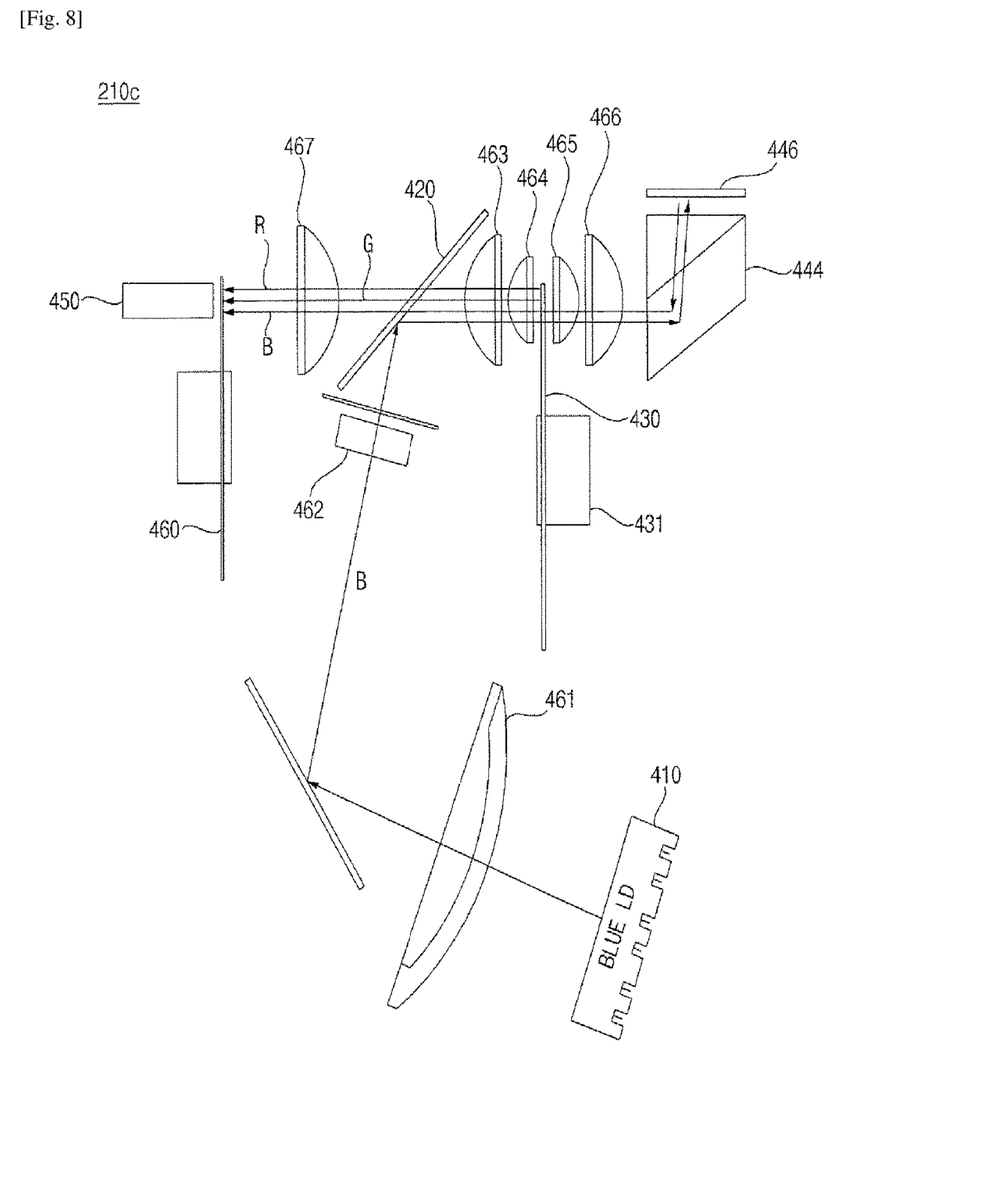
FIG. 8 is a view showing another example of the structure of the optical unit of FIG. 2.

FIG. 8 is a view showing another example of the structure of the optical unit of FIG. 2.

An optical unit 210c of FIG. 8 is similar to the optical unit 210b of FIGS. 4 and 5 except that the polarization converter 440 includes a prism 444 coated with a retarder layer instead of the quarter wavelength plate (QWP) 442.

Figure 9:
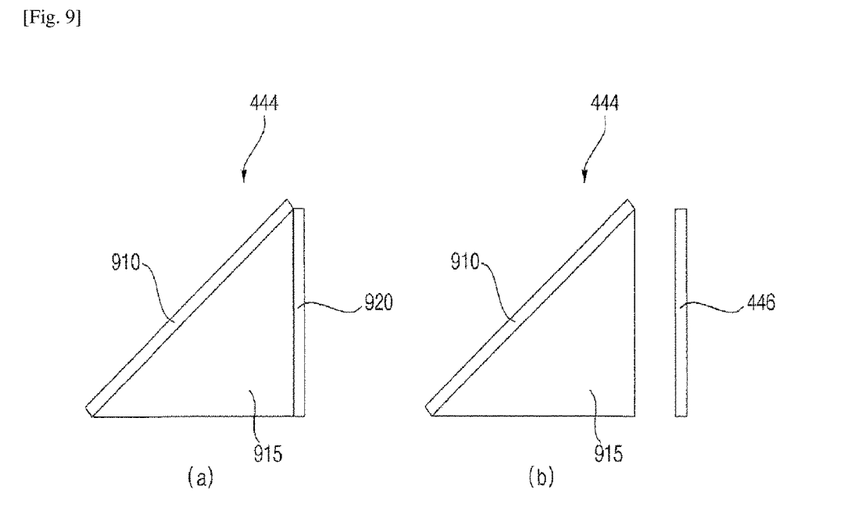
FIG. 9 is a view showing various examples of a prism of FIG. 8.

FIG. 9 is a view showing various examples of the prism of FIG. 8

Referring first to FIG. 9(a), the prism 444 may include a retarder layer coating 910 applied to a first surface and a mirror coating 920 applied to a second surface intersecting the first surface. In the structure of FIG. 9(a), an additional mirror 446 may be omitted.

Referring now to FIG. 9(b), the retarder layer coating 910 is applied to the first surface of the prism 444, but no mirror coating is applied to the second surface intersecting the first surface. In this structure, an additional mirror 446 may be disposed while being spaced apart from the prism 444.

Figure 10:
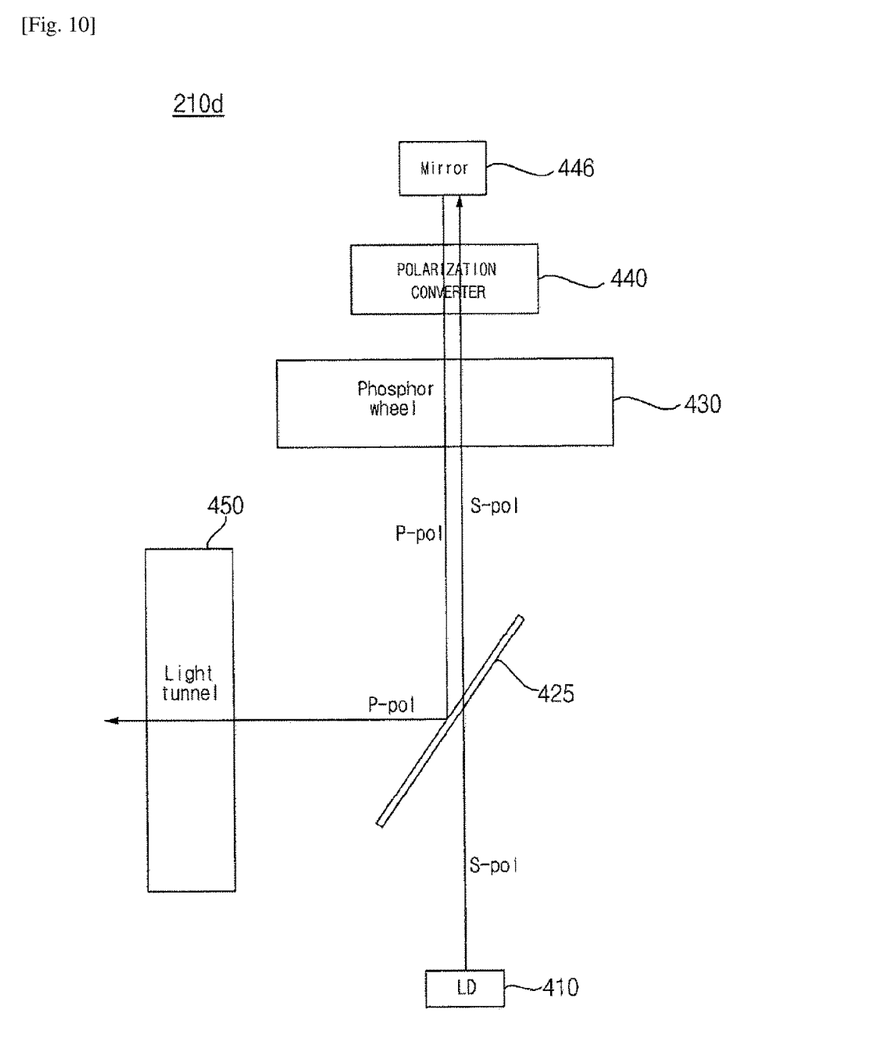
FIG. 10 is a view showing a further example of the structure of the optical unit of FIG. 2.

FIG. 10 is a view showing a further example of the structure of the optical unit of FIG. 2.

Referring to the figure, an optical unit 210d of FIG. 10 is similar to the optical units of FIGS. 4 to 9 except that the optical unit 210d includes a polarization separator 425 for transmitting an S-polarized light and reflecting a P-polarized light.

As a result, arrangement of the polarization converter 440, the wheel 430, the polarization separator 420, and the optical output unit 450 is changed as shown in the figure.

That is, the polarization converter 440, the wheel 430, and the polarization separator 420 are arranged in a line, and the optical output unit 450 is arranged in a direction intersecting a direction in which the polarization converter 440, the wheel 430, and the polarization separator 420 are arranged.

In addition, red and green phosphors may be applied to the wheel. Alternatively, green, red, and green phosphors may be applied to the wheel.

In addition, the wheel may have the same structure as the wheel of FIG. 6. Alternatively, the wheel may have the same structure as the wheel of FIG. 7.

In addition, the polarization converter 440 may include a prism 444 as shown in FIG. 8. Furthermore, various prisms 444 as shown in FIG. 9 may be used.

Figure 11:
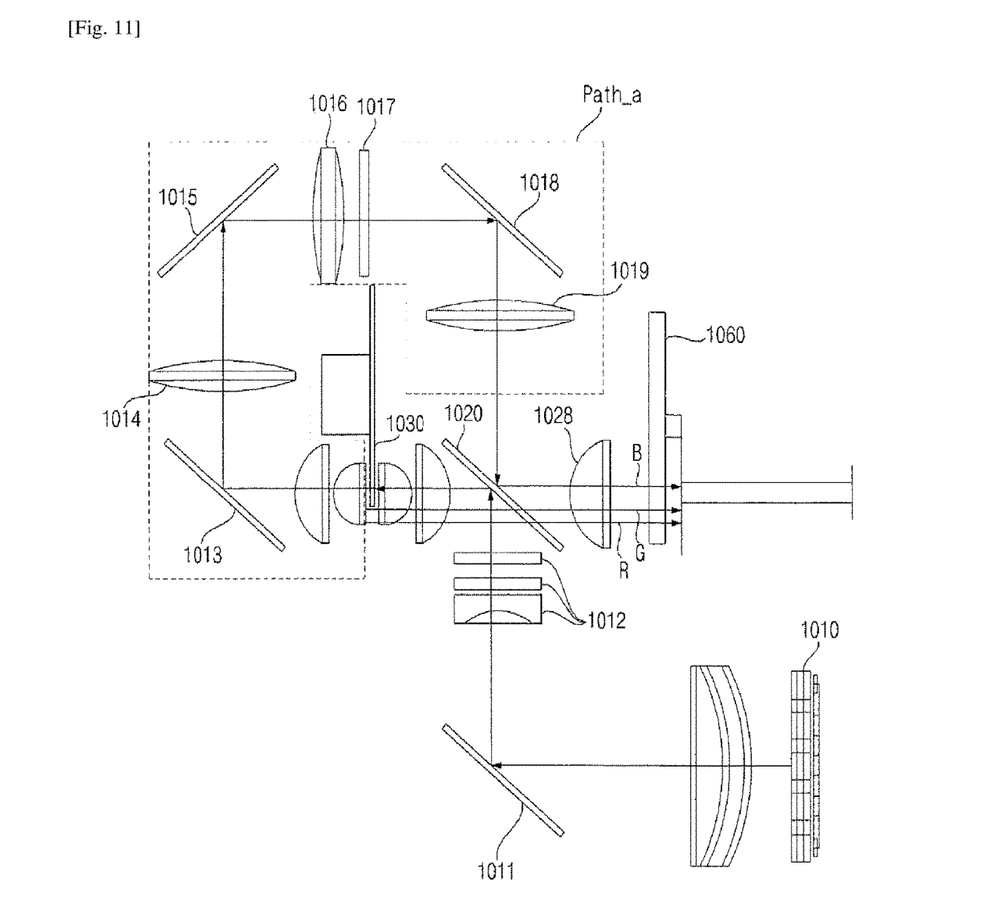
FIG. 11 is a view showing an optical unit related to the present invention.

FIG. 11 is a view showing an optical unit related to the present invention.

FIG. 11 shows an optical unit 1000 different from the optical units according to the present invention.

Referring to FIG. 11, a first polarized blue light from a blue light source 1010 is reflected by a mirror 1011, is transmitted through an optical lens 1012, is reflected by a polarization separator 1020, and is incident upon a wheel 1030. The blue light is transmitted through the wheel 1030, passes through a mirror 1013, an optical lens 1014, a mirror 1015, optical lenses 1016 and 1017, a mirror 1018, and an optical lens 1019, is reflected by the polarization separator 1020 again, and is output.

Meanwhile, a red light and a green light, excluding the blue light, are reflected by the wheel 1030, are transmitted through the polarization separator 1020, and are output.

As shown in the figure, a path of the blue light denoted by reference symbol Path_a extends through the mirrors 1013, 1015, and 1018. As a result, the optical unit may not have a compact structure.

According to the present invention, however, as shown in FIGS. 4 to 10, the polarization converter 440 is provided. As a result, it is possible to align optical output paths of the blue light, the green light, and the red light from the wheel 430 and the optical output unit 450, whereby it is possible to provide a compact optical device that is capable of achieving highly efficient light output.

In addition, the polarization converter 440 is disposed at the rear of the wheel 430. At the time of outputting a high power light, therefore, only a specific light, e.g. a blue light, is incident upon the polarization converter and is then output from the polarization converter. Consequently, it is possible to improve reliability of the polarization converter 440. In addition, it is possible to increase a degree of freedom in design for the optical lenses disposed between the wheel 430 and the polarization separator 420 or between the polarization separator 420 and the polarization converter 440.

The image projection apparatus according to the embodiment of the present invention may not be limitedly applied to the construction and method of the embodiments as previously described; however, all or some of the embodiments may be selectively combined to achieve various modifications.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

Mode for the Invention

Various embodiments have been described in the best mode for carrying out the invention.

Industrial Applicability

An optical device according to an embodiment of the present invention and an image projection apparatus including the same each include a laser diode for outputting a laser light having a predetermined wavelength, a polarization separator for transmitting a first polarized light of the laser light and reflecting a second polarized light of the laser light, a wheel including a wavelength conversion unit for converting a wavelength of the second polarized light of the laser light reflected by the polarization separator such that the second polarized light of the laser light corresponds to one selected from among a blue light, a green light, and a red light and a transmission unit for transmitting the other lights, a polarization converter for converting the light transmitted through the wheel into the first polarized light and outputting the converted first polarized light to the wheel, and an optical output unit for outputting the first polarized light from the polarization converter and the light converted in wavelength and reflected by the wheel, whereby it is possible to provide a compact optical device that is capable of achieving highly efficient light output. Consequently, the present invention has industrial applicability.

The invention claimed is:

1. An optical device comprising:
a laser diode for outputting a laser light having a predetermined wavelength;
a polarization separator for transmitting a first polarized light of the laser light and reflecting a second polarized light of the laser light;
a wheel comprising a wavelength conversion unit for converting a wavelength of the second polarized light of the laser light reflected by the polarization separator such that the second polarized light of the laser light corresponds to one selected from among a blue light, a green light, and a red light and a transmission unit for transmitting the other lights;
a polarization converter for converting the light transmitted through the wheel into the first polarized light and outputting the converted first polarized light to the wheel;
an optical output unit for outputting the first polarized light from the polarization converter and the light converted in wavelength and reflected by the wheel; and
a second wheel disposed between the optical output unit and the polarization separator for sequentially outputting the blue light, the green light, and the red light from the polarization separator to the optical output unit.

2. The optical device according to claim 1, wherein the transmission unit has a diffusion part for diffusing the lights transmitted through the transmission unit.

3. The optical device according to claim 1, wherein
the wheel transmits the first polarized light from the polarization converter to the polarization separator, and
the polarization separator transmits the first polarized light from the wheel to the optical output unit and transmits the light reflected by the wheel to the optical output unit.

4. The optical device according to claim 1, wherein the polarization converter comprises a quarter wavelength plate.

5. The optical device according to claim 4, further comprising a mirror for reflecting the light reflected by the polarization converter and outputting the reflected light to the polarization converter.

6. The optical device according to claim 1, wherein the polarization converter comprises a prism coated with a retarder layer.

7. The optical device according to claim 1, wherein
the laser diode outputs a blue light,
the polarization separator transmits a first polarized light of the blue light and reflects a second polarized light of the blue light, and
when the second polarized light of the blue light reflected by the polarization separator is incident upon the wheel, the wheel reflects a green light and a red light and transmits the blue light.

8. The optical device according to claim 1, wherein
the laser diode outputs a blue light,
the polarization separator transmits a first polarized light of the blue light and reflects a second polarized light of the blue light, and
when the second polarized light of the blue light reflected by the polarization separator is incident upon the wheel, the wheel reflects a yellow light, a green light, and a red light and transmits the blue light.

9. The optical device according to claim 1, wherein
the first polarized light is a P-polarized light, and the second polarized light is an S-polarized light, and
the polarization converter, the wheel, the polarization separator, and the optical output unit are arranged in a line.

10. The optical device according to claim 1, wherein
the first polarized light is an S-polarized light, and the second polarized light is a P-polarized light, and
the polarization converter, the wheel, and the polarization separator are arranged in a line, and the optical output unit is arranged in a direction intersecting a direction in which the polarization converter, the wheel, and the polarization separator are arranged.

11. An image projection apparatus comprising:
a controller for outputting an image signal; and
an image output unit for outputting an image to be projected based on the image signal from the controller, wherein
the image output unit comprises an optical unit for outputting a visible light, and
the optical unit comprises:
a laser diode for outputting a laser light having a predetermined wavelength;
a polarization separator for transmitting a first polarized light of the laser light and reflecting a second polarized light of the laser light;
a wheel comprising a wavelength conversion unit for converting a wavelength of the second polarized light of the laser light reflected by the polarization separator such that the second polarized light of the laser light corresponds to one selected from among a blue light, a green light, and a red light and a transmission unit for transmitting the other lights;
a polarization converter for converting the light transmitted through the wheel into the first polarized light and outputting the converted first polarized light to the wheel; and
an optical output unit for outputting the first polarized light from the polarization converter and the light converted in wavelength and reflected by the wheel; and
wherein the optical unit further comprises a second wheel disposed between the optical output unit and the polarization separator for sequentially outputting the blue light, the green light, and the red light from the polarization separator to the optical output unit.

12. The image projection apparatus according to claim 11, wherein
the first polarized light is a P-polarized light, and the second polarized light is an S-polarized light, and
the polarization converter, the wheel, the polarization separator, and the optical output unit are arranged in a line.

13. The image projection apparatus according to claim 11, wherein
the first polarized light is an S-polarized light, and the second polarized light is a P-polarized light, and
the polarization converter, the wheel, and the polarization separator are arranged in a line, and the optical output unit is arranged in a direction intersecting a direction in which
the polarization converter, the wheel, and the polarization separator are arranged.

* * * * *